United States Patent
Boomershine, III

(10) Patent No.: US 7,154,387 B2
(45) Date of Patent: Dec. 26, 2006

(54) VEHICLE DECELERATION WARNING SYSTEM

(76) Inventor: Walter McKinley Boomershine, III, 337 Redland Rd., Atlanta, GA (US) 30309

( * ) Notice: Subject to any disclaimer, the term of this patent is extended or adjusted under 35 U.S.C. 154(b) by 189 days.

(21) Appl. No.: 10/512,234

(22) PCT Filed: Aug. 22, 2003

(86) PCT No.: PCT/US03/26362

§ 371 (c)(1),
(2), (4) Date: Oct. 21, 2004

(87) PCT Pub. No.: WO2004/018256

PCT Pub. Date: Mar. 4, 2004

(65) Prior Publication Data

US 2005/0237172 A1    Oct. 27, 2005

Related U.S. Application Data

(60) Provisional application No. 60/405,574, filed on Aug. 23, 2002.

(51) Int. Cl.
*B60Q 1/50* (2006.01)
(52) U.S. Cl. .................. 340/467; 340/463; 340/464; 340/472; 362/499
(58) Field of Classification Search .............. None
See application file for complete search history.

(56) References Cited

U.S. PATENT DOCUMENTS

| | | | | |
|---|---|---|---|---|
| 3,332,060 A | * | 7/1967 | Liljequist | 340/467 |
| 3,763,585 A | * | 10/1973 | Mosch | 40/591 |
| 4,769,629 A | * | 9/1988 | Tigwell | 340/467 |
| 4,857,890 A | * | 8/1989 | Solow | 340/479 |
| 4,916,431 A | * | 4/1990 | Gearey | 340/479 |
| 5,150,961 A | * | 9/1992 | Gonzalez | 362/497 |
| 5,736,926 A | * | 4/1998 | Winholtz | 340/479 |
| 6,404,334 B1 | * | 6/2002 | Chao | 340/472 |
| 6,417,767 B1 | * | 7/2002 | Carlson et al. | 340/467 |
| 6,529,126 B1 | * | 3/2003 | Henry | 340/467 |
| 2004/0004827 A1 | * | 1/2004 | Guest | 362/31 |

* cited by examiner

*Primary Examiner*—Daniel Wu
*Assistant Examiner*—Son Tang
(74) *Attorney, Agent, or Firm*—Philip H. Burrus, IV

(57) ABSTRACT

A warning system housed in a license plate bracket and installed on a vehicle. The system includes a self-contained power source, an accelerometer to measure the deceleration force of the vehicle, and a microprocessor unit (including a microprocessor chip). When the system senses that the vehicle is decelerating at a rate greater than a threshold level, it illuminates warning lights provided on the license plate bracket to thereby alert drivers of neighboring vehicles of the vehicle's rapid deceleration. The warning system is self-contained and self-powered to avoid the need to, and associated drawbacks of, drawing from the vehicle's power source.

20 Claims, 6 Drawing Sheets

VEHICLE DECELERATION WARNING SYSTEM

CROSS REFERENCE TO RELATED APPLICATIONS

This application is the U.S. National Phase of PCT/US03/26362, filed on Aug. 22, 2003 which application claims the benefit of U.S. Provisional Application No. 60/405,574 filed on Aug. 23, 2002, the contents of which are incorporated by reference herein.

REFERENCE TO RELATED APPLICATION

This application is based on and hereby claims priority to U.S. Provisional Patent Application Ser. No. 60/405,574, filed Aug. 23, 2002.

FIELD OF THE INVENTION

This invention relates to a system for supplementing a vehicle's current brake system to more rapidly alert drivers of another vehicle's rapid deceleration.

BACKGROUND OF THE INVENTION

The motorways of the world are becoming increasingly dangerous with the added increase of automobiles per household. Added to the increase in motor vehicle traffic is the increase in speed of each vehicle on the motorway. Many municipal transportation authorities recommend a distance between vehicles in motion of one second per 10 miles an hour of time elapse between the leading vehicle and trailing vehicle. Therefore, at a speed of 60 miles per hour motorists should allow at least 6 seconds in between each vehicle. Statistics show that over 12 million auto accidents happen annually with over half of those accidents being a rear end type of collision. Forty thousand deaths occur every year from these accidents and over 2 million injuries occur. All of these statistics indicate that the recommended distance between moving vehicles is not being adhered to. The ability to change driver's skill is difficult, therefore a device is necessary to help reduce rear end collisions at motorway speeds.

Devices exist that heighten other driver's awareness of a vehicle that is slowing down rapidly. These devices have utilized the center high mounted stop lamp of the vehicle and make the center high mounted stop lamp flash when the brake pedal is depressed. Awareness is increased at first, but with time drivers become desensitized or even annoyed at the flashing center high mounted brake light. In time, this desensitization undermines the effectiveness of the brake light in preventing and reducing rear end collisions.

Other devices cease flashing the center high mounted brake lamp after a prescribed amount of time. These devices tamper with the vehicles factory wiring system, which, unknown to many vehicle owners, can void any warranty from the manufacturer of the vehicle. To date, the above-described devices are operable to modulate the stop lamp or separate light principally when the driver of the vehicle is depressing a brake pedal or otherwise actuating the brake system of the vehicle. Accordingly, the proposed devices are not continuously operable, since they are only energized when power to the brake lights is also applied. In an instance where a driver of a vehicle may not be aware of a braking situation and therefore no depression of the brake pedal occurs, these devices are rendered useless.

Other devices have been developed to utilize a solid-state system composed of an accelerometer to measure the deceleration force of a vehicle and a microprocessor to energize the brake light or other illumination device on a vehicle. While these devices are closer to creating a successful design to reduce the likeliness of a rear end collision, most of these proposed devices are too complicated to retrofit into an existing vehicle. These devices also must utilize the vehicle's 12-volt system, which requires someone to tamper with the very complicated wiring harness of the vehicle. Vehicles generally built after 1990 have an On Board Diagnostic System Series II (OBDS II). OBDS II has more computing power than the Apollo spaceships designed by NASA. A wiring harness meltdown due to a simple short developed from one of the proposed devices which utilizes the vehicle wiring system could result in a system failure of the OBDS II, which controls such life saving vehicle devices as the Antilock braking system, Airbag Deployment System, and all warning illumination systems. Therefore, the devices discussed above should not be utilized due to these serious safety concerns.

In addition, many devices utilize potential success of the solid-state accelerometer and microprocessor combination to create a useful embodiment, but they propose to utilize the vehicle brake lamp configuration and not the hazard illumination lights of the vehicle. Many vehicles have amber hazard light combinations rather than red, thereby drawing more immediate attention to the vehicle in hazardous conditions such as breakdowns, fog or low light conditions, or post accident conditions. Any vehicle equipped with an amber hazard illumination system has already passed strict department of transportation rules to allow for a flashing amber hazard light in that country. In contrast, some municipalities do not allow for a flashing brake lamp. Thus, many of the devices that utilize the original manufacturer's equipment brake light system of a vehicle as a warning system may not be legal on many roadways. Finally, devices that utilize the primary brake light of a vehicle potentially expose that vehicle to a complete loss of any brake light indication if there is a system failure. Systems that utilize the amber warning lights of a vehicle are not utilizing the primary means of warning other drivers as to the braking of a vehicle and are much safer in a real world scenario.

U.S. Pat. No. 6,411,204 to Bloomfield et al. describes an anti-collision safety light for a vehicle that utilizes a solid state accelerometer and a microprocessor, but this device utilizes the vehicle's power system exposing the vehicle to a complete wiring meltdown resulting in severe safety limitations and expensive electrical diagnosis and repair.

U.S. Pat. No. 6,249,219 to Perez et al. describes an anti-collision safety light for a vehicle that utilizes a solid-state accelerometer and a microprocessor that draws from the vehicle's power system and thus presents the same drawbacks as the Bloomfield device. Moreover, this device also utilizes the red brake light of the vehicle which does not command as much attention as an amber hazard lamp, and furthermore some government municipalities do not allow for a brake lamp to flash, thereby potentially making a vehicle with this device illegal on some road ways.

U.S. Pat. No. 6,023,221 to Michelotti describes an anti-collision safety light for a vehicle that utilizes a solid state accelerometer and a microprocessor which will energize the hazard warning light system of a vehicle, but this device also utilizes the vehicles power system and thus presents drawbacks similar to the above-mentioned devices of prior art references. This device also must be manually reset by the vehicle operator, or will reset after the microprocessor detects a series of positive acceleration values consistent to normal vehicle operations. Increased calculations by a micro processing unit increase the costs of development and manufacturing and introduce more opportunity for error in the unit than a system that will simply cease to activate after a set amount of time.

U.S. Pat. No. 5,786,753 to Craig et al. describes an anti-collision safety light for a vehicle that utilizes a solid state accelerometer and a microprocessor that energizes the hazard warning light system of a vehicle, but again this device draws from the vehicle's power system and thus presents the associated drawbacks discussed above. Moreover, there are many complicated devices involved in this device such as a signal generator including a number of inertial switches, an oscillator, and four Schmitt triggers all of which expose this device to many points of failure and may be difficult to retro fit on a vehicle. This device is also dependant upon the depressing of the vehicle's brake pedal and is not effective if a vehicle operator does not have a chance to depress the brake pedal.

U.S. Pat. No. 4,751,493 to Miller is a proposed device that can be retrofit to an existing vehicle, but activation of the warning system is dependant upon the driver of the vehicle removing his foot from the vehicle's accelerator pedal. This device also utilizes an amber light unit not factory installed on the vehicle and therefore may not be permitted by many road authorities.

Thus, a need exists for a vehicle deceleration warning system that does not draw from the vehicle's power supply and for a system that unambiguously relates to neighboring drivers that a vehicle is rapidly decelerating.

SUMMARY OF THE INVENTION

This invention supplements a vehicle's current braking system by providing an additional warning system to more rapidly alert drivers of neighboring vehicles as to a rapid decrease in acceleration force in a severe driving situation and thereby reduce the risk of rear-end collisions. The system includes a self-contained power source, an accelerometer to measure the deceleration force of the vehicle, and a microprocessor unit (including a microprocessor chip), all of which are fitted onto a vehicle. When the system senses that the vehicle is decelerating at a rate greater than a threshold level, it activates lights on the vehicle to warn neighboring drivers.

In one embodiment, the system is designed to illuminate the vehicle's hazard illumination lights for a prescribed amount of time and then cease the illumination sequence. In another embodiment, the system is housed in a license plate bracket equipped with warning lights. These systems are self-contained and self powered, therefore negating the need to tamper with the vehicle's factory installed wiring harness.

It is an object of this invention to facilitate a visible warning signal to surrounding vehicles as to a rapid deceleration in vehicle speed so to avoid a rear-end collision situation.

It is another object of this invention to provide a warning system that does not draw from the vehicle's power supply.

It is another object of this invention to provide an easy to install and automated device that will protect occupants of vehicles equipped with the invention from rear-end collision situations.

DETAILED DESCRIPTION OF THE DRAWINGS

Figure 1:
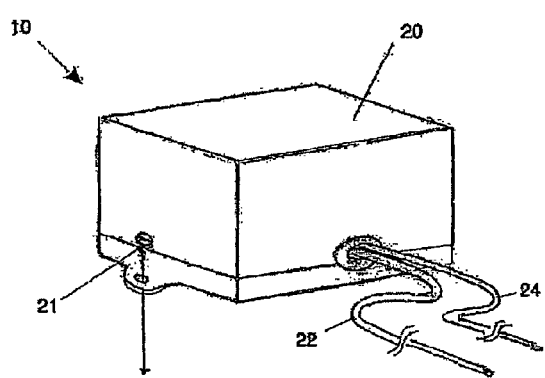
FIG. 1 is a perspective view of the warning system according to one embodiment of this invention.
Figure 2:
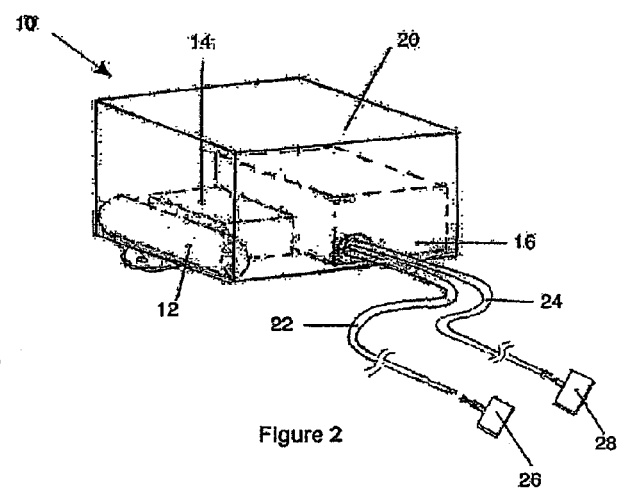
FIG. 2 is the perspective view of FIG. 1 with internal components shown in broken lines.

FIGS. 1 and 2 illustrate a hazard light activation warning system 10 directed to illuminating the hazard lights of a vehicle in response to the vehicle's deceleration. The warning system includes a self-contained power source 12, an accelerometer 14 or other device to measure the deceleration force of the vehicle, and a microprocessor unit 16 (including a microprocessor chip) to activate the illumination sequence of the vehicle's hazard illumination lights (not shown) for a prescribed amount of time and then cease the illumination sequence.

The power source 12 may be, but does not have to be, a battery (e.g., an alkaline, lithium, or other type of battery), preferably capable of at least 1 year of life. Provision of an independent power source eliminates the need to tap into the vehicle factory installed wiring harness for power, which can cause electrical problems and ultimately void remaining factory warranty on the vehicle.

The accelerometer 14 is preferably, but does not have to be, a single axis accelerometer. The accelerometer detects the deceleration force of the vehicle and, upon sufficient force, signals the microprocessor unit 16 to activate the hazard warning lights (generally by completion of a circuit which supplies current to the microprocessor unit). The microprocessor unit 16 controls the pulse rate and flashing period (both of which may be adjusted) of the bulbs.

The warning system 10 may be easily retrofitted onto an existing vehicle without tampering with the vehicle's wiring harness leading to the 12-volt power source. Installation of the warning system 10 may be facilitated by mounting (such as with screws 21) the power source 12, accelerometer 14, and microprocessor unit 16, all of which are preferably contained in a single housing 20, at any location on the vehicle that allows for an accurate reading of the forward and backward forces of the vehicle to be detected by the system's accelerometer 14. The system 10 is preferably, but does not have to be, housed in a tough and water-resistant ABS plastic housing 20 measuring roughly 5"×5"×3".

Wire leads 22, 24 for connecting with the vehicle's hazard light assembly protrude from the housing. FIGS. 1 and 2 illustrate two wire leads 22, 24, each for ultimately connecting to a bulb of the hazard light assembly. The leads 22, 24 should have a length that allows them to reach from the housing 20, no matter where its position on the vehicle, to the rear hazard light assembly of the vehicle. The ends of the wire leads 22, 24 may be fitted with adapters 26, 28 for connecting the system 10 to the specific type of hazard light bulb assembly for the particular manufacturer of the vehicle. Most vehicle manufacturers outsource the light bulbs and bulb assemblies from four major manufacturers world wide, those manufacturers being, Sylvania, General Electric, Bosch, and Phillips. Connecting the leads 22, 24 to the hazard lamp unit via the adaptors 26, 28 will complete the electrical circuit from the housing 20 to the lamp assembly thereby making the system 10 active. The system 10 will preferably include a manual activation button (not shown) located on the exterior of the housing 20 that will allow the user to confirm operation of the system 10.

In use, the system 10 works by sensing rapid deceleration levels greater than a threshold level and automatically activating the vehicle's factory equipped hazard-warning lights at a specified rate (e.g. 3 flashes per second) for a specified duration (e.g., 7 seconds). A microprocessor chip, which can but does not have to have a manual test button, controls all functions. The system 10 can be overridden by depressing the hazard warning light button in the vehicle cabin. The system 10 is self-contained and self powered, therefore negating the need to tamper with the vehicle's factory installed wiring harness.

In alternative embodiments of this invention (see FIGS. 3–7, where the same reference numerals have been used to identify the same structure), a warning system 30 is housed in a license plate bracket 32 as currently utilized by millions of vehicles on the road. The bracket 32 may be mounted anywhere a license plate is utilized on a vehicle. The bracket 32 is provided with warning lights 34 that are automatically activated upon sufficient deceleration force of the vehicle to alert drivers of surrounding cars.

The license plate bracket 32 includes a front housing 36 and a back housing 38, both of which are preferably, but do not have to be, made from a suitable plastic material. Other materials, such as metal, are also suitable in this application. The front housing 36 and back housing 38 can be secured together in any suitable way and by any suitable means, including a snap-fit connection, an interference fit, welding, melting, gluing, etc.

The front housing 36 houses light emitting diode ("LED") warning lights 34. While any type of lights may be used and any color(s) may be chosen for the lights, bright and bold colors that easily attract attention are preferable.

The system 30 includes a device, such as an accelerometer 46 and preferably a single axis accelerometer, to measure the deceleration force of the vehicle. The system 30 further includes a microprocessor unit 48 (including a microprocessor chip) to activate the illumination sequence of the LED warning lights 34 for a prescribed amount of time and then cease the illumination sequence.

Figure 3:
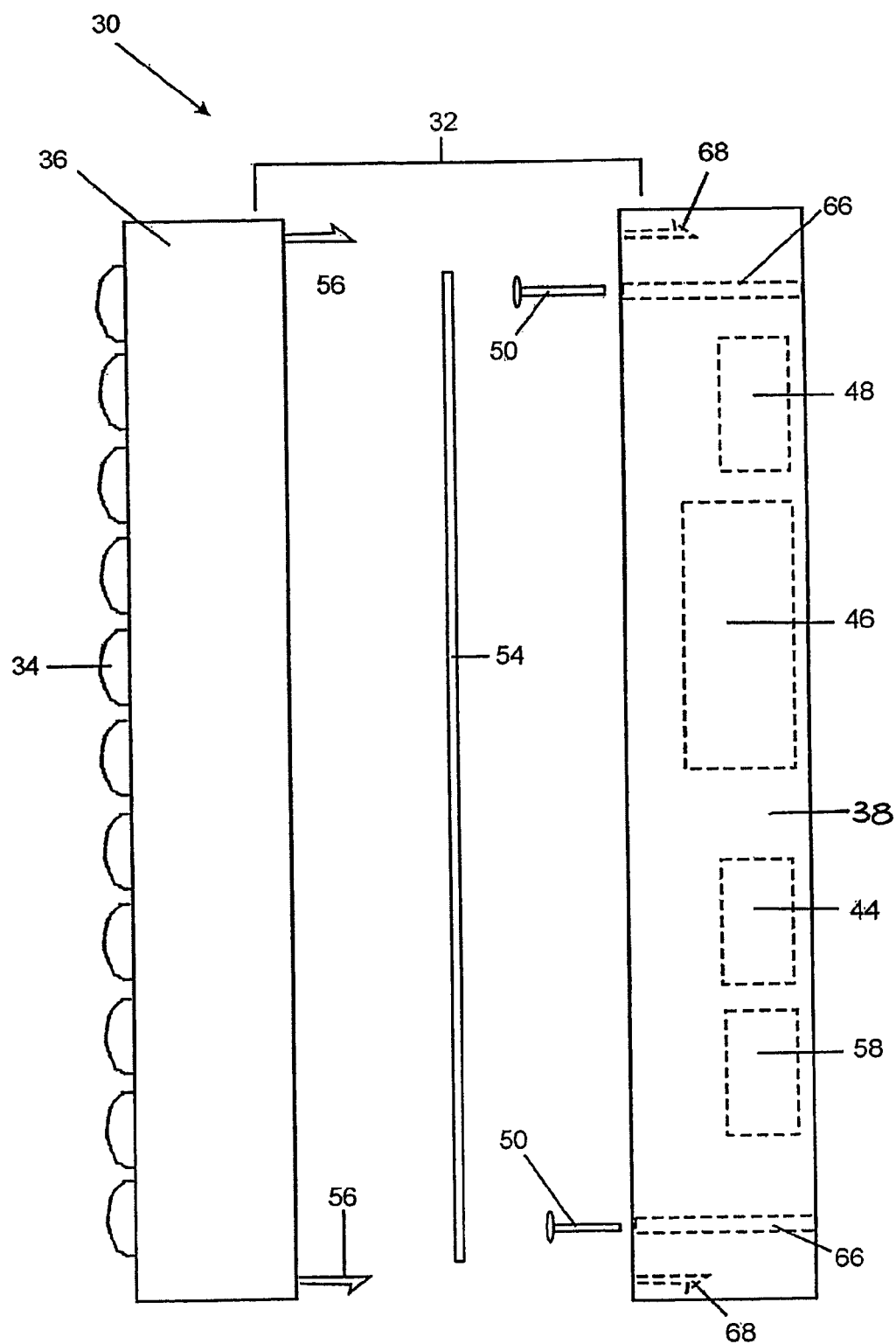
FIG. 3 is an exploded side elevation view of the warning system according to another embodiment of this invention with internal components shown in broken lines.
Figure 4:
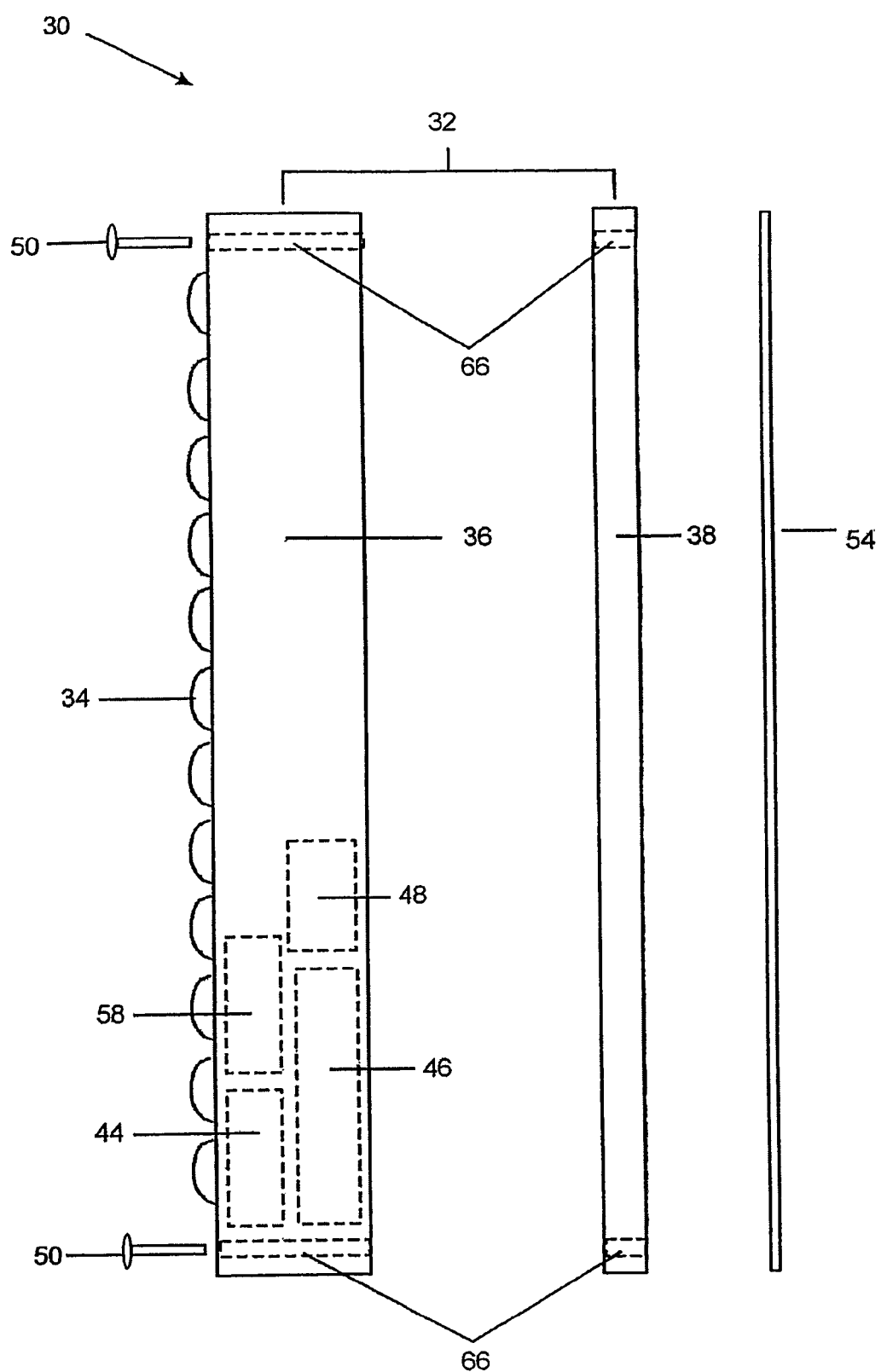
FIG. 4 is an exploded side elevation view of the warning system according to yet another embodiment of this invention with internal components shown in broken lines.
Figure 5:
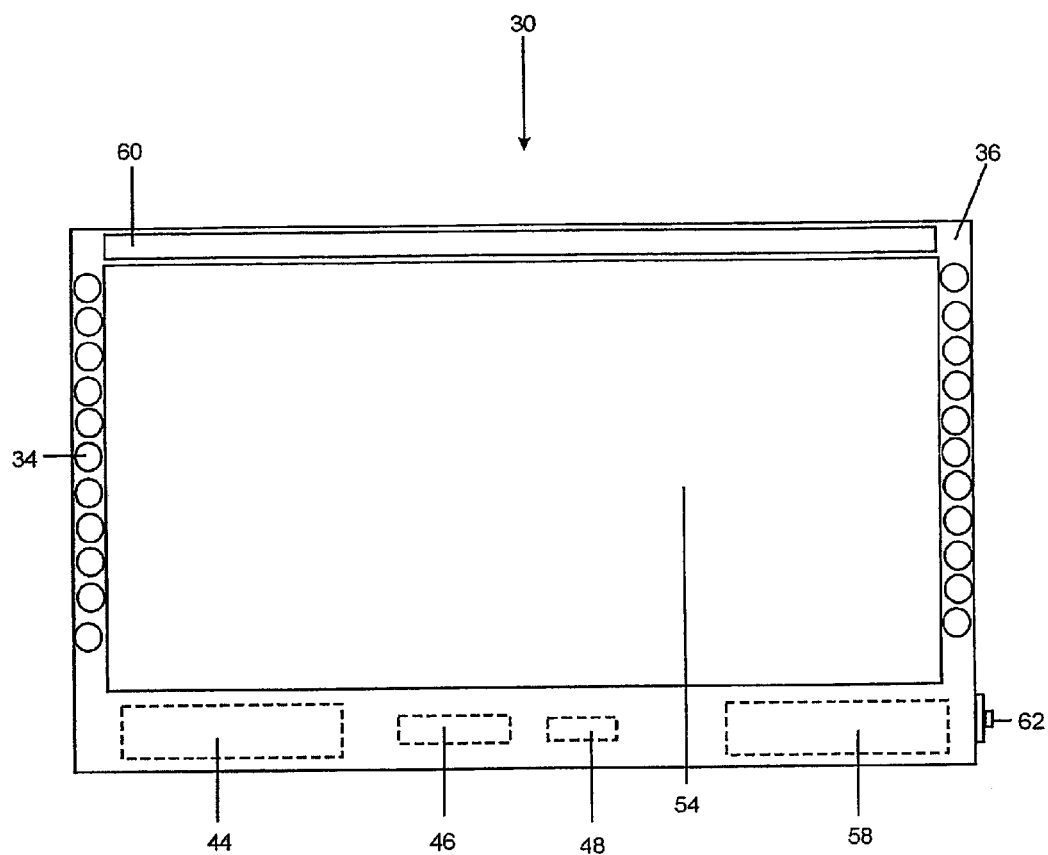
FIG. 5 is a front elevation view of the warning systems of FIGS. 3 and 4.

The system 30 also preferably includes at least two self-contained power sources 44, 58 configured to power, in any combination, the accelerometer 46, microprocessor unit 48, and warning lights 34. By way only of example, one power source can be provided to power the accelerometer 46 and microprocessor unit 48 while another power source can be provided to power warning lights 34. The power sources 44, 58 may be, but do not have to be, batteries (e.g., an alkaline or lithium battery) capable of at least one year of life (but preferably more) under normal operation of the system. While multiple power sources 44, 58 are depicted in FIGS. 3–5, a single power source may be used to power the accelerometer 46, microprocessor unit 48, and warning lights 34. Solar panel(s) 60 (see FIG. 5) may be provided on the bracket 32 to recharge the power source(s). Again, provision of independent power sources eliminates the need to tap into the vehicle factory installed wiring harness for power and thus avoids the problems associated therewith.

The power sources 44, 58, accelerometer 46, and microprocessor unit 48 can be housed in either the front housing 36 (see FIG. 4) or the back housing 38 (see FIG. 3) or some combination of both. These components can be mounted in any way and at any location in license plate bracket 32 and are shown schematically in the drawings as broken line rectangular structures, the sizes of which are not drawn to scale. The power sources 44, 58, accelerometer 46, microprocessor unit 48, and warning lights 48 can be connected together in any suitable way (such as by electrical connectors), all of which would be obvious to one of skill in the art, to operate as follows.

In use, the accelerometer 46 detects the deceleration force of the vehicle and, upon sufficient force, triggers the microprocessor unit 48 to activate the LED warning lights 34 (generally by completion of a circuit which supplies current to the microprocessor unit). Upon signaling by the accelerometer 46, the microprocessor unit 48 activates the LED warning lights 34. The microprocessor unit 48 controls the pulse rate and flashing period (both of which may be adjusted) of the lights 34. The system 30 may, but does not have to, include a manual activation button 62 (see FIG. 5) located on the license plate bracket 32 that will allow the user to confirm operation of the system 30.

To install the system 30, the license plate bracket 32 can be mounted to the vehicle 52 using the existing holes for the license plate already provided on the vehicle 52. Mounting screws 50 (which can, but do not have to be, the same screws provided for securing the license plate to the vehicle) may be used to secure the license plate bracket 32 on the vehicle 52. The license plate bracket 32 may be equipped with a variety of holes or mounting points to accommodate for variances in mounting locations on vehicles. In this way, the license plate bracket 32 is easily retrofitted onto an existing vehicle. While the drawings show the system 30 installed on the rear of a vehicle 52, the system 30 could be utilized anywhere on a vehicle and on any type and size of vehicle including trailers or towed vehicles.

The license plate 54 can be positioned between the front housing 36 and back housing 38 (see FIG. 3) or between the back housing 38 and the vehicle 52 (see FIG. 4).

To install the system 30 of FIG. 3, the back housing 38 (provided with apertures 66) is mounted onto the vehicle with screws 50. After the back housing 38 is secured on the vehicle 52, the license plate 54 is sandwiched between the back housing 38 and the front housing 36. The front housing 36 and backing housing 38 are secured together with connectors tabs 56 extending from the front housing 36 that are received in slots 68 provided in the back housing 38. As explained above, however, the front housing 36 and back housing 38 may be secured together by any means.

Figure 6:
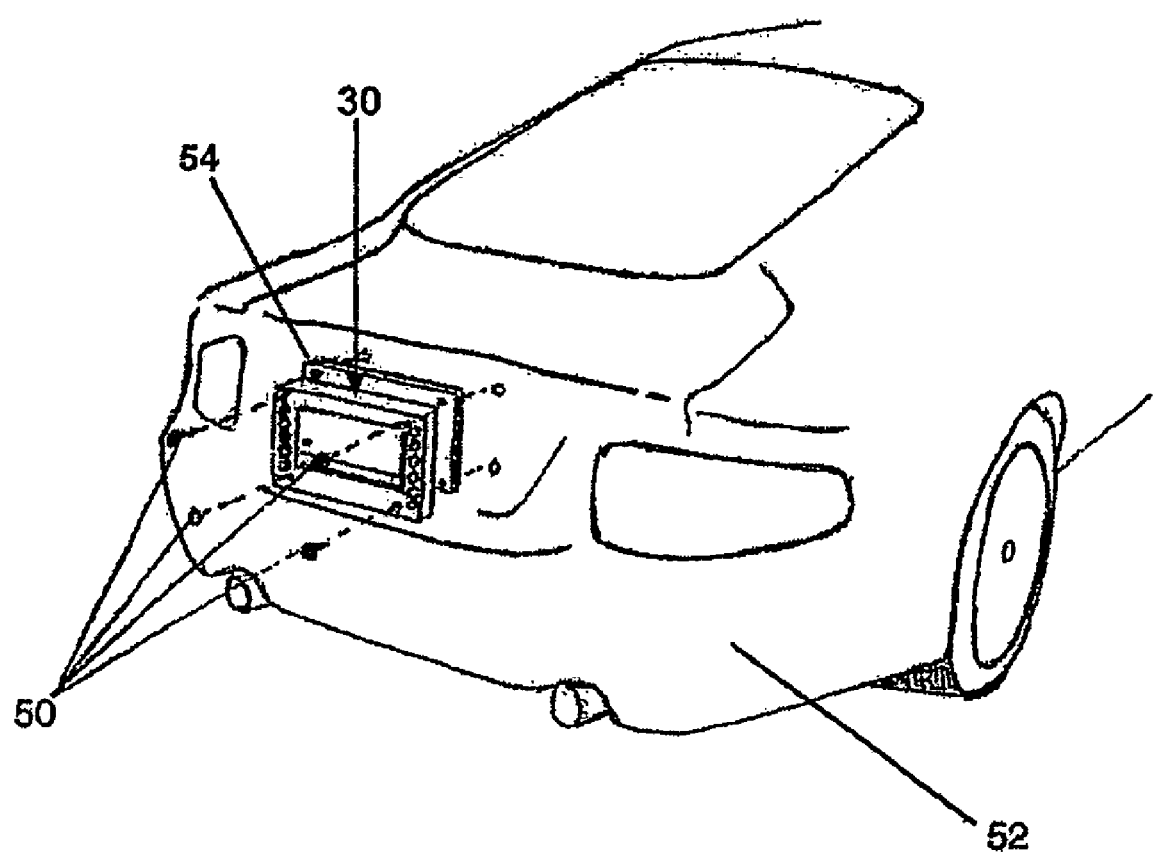
FIG. 6 is the warning system of FIG. 4 shown being attached to a vehicle.
Figure 7:
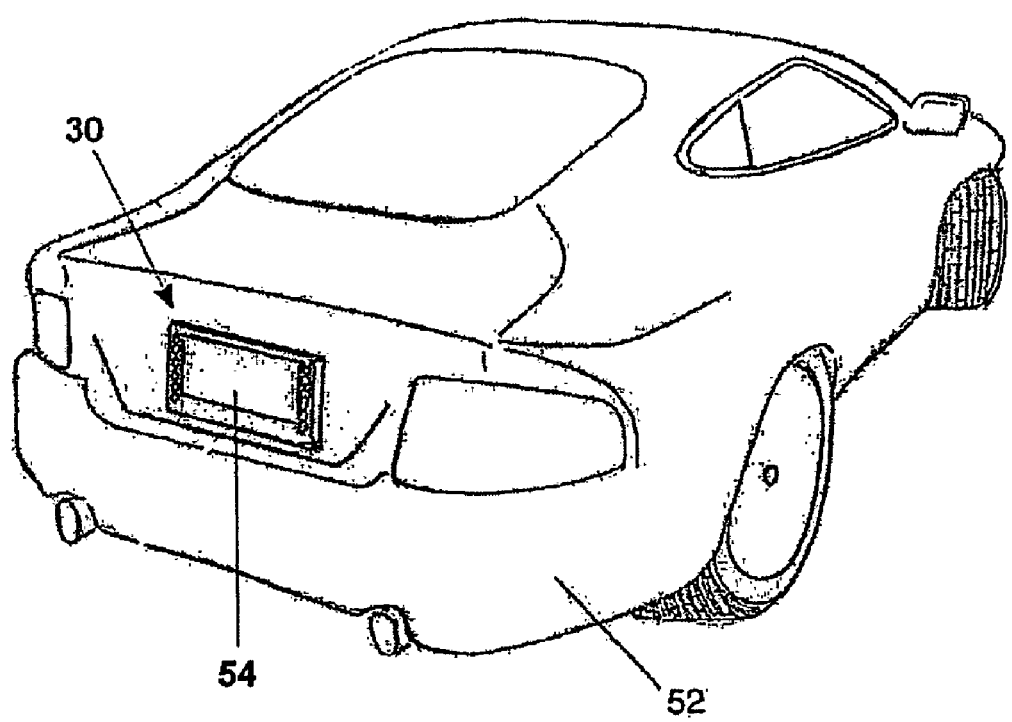
FIG. 7 is a perspective view of the warning system of FIG. 4 attached to a vehicle.

In the embodiment of FIG. 4, the license plate 54 is positioned between the back housing 38 and vehicle 52. Apertures 66 extend through the front housing 36 and back housing 38. The apertures 66 receive mounting screws 50 that secure both the license plate bracket 32 and the license plate 54 to the vehicle 52, as shown in FIG. 6. Once again, however, the license plate bracket 32 and the license plate 54 may be assembled and mounted on the vehicle 52 in any suitable way. FIG. 7 shows a vehicle 52 with a license plate bracket 32 and license plate 54 mounted thereon.

In use, the system 30 works by sensing rapid deceleration levels greater than a threshold level and automatically activating the LED warning lights 34 at a specified rate (e.g. 3 flashes per second) for a specified duration (e.g., 7 seconds). The system 30 is self-contained and self powered, therefore negating the need to tamper with the vehicle's factory installed wiring harness.

It should be noted that a vehicle can easily and quickly be equipped with both system 10 and system 30 to further reduce the risk of being involved in a collision.

The foregoing is provided for the purpose of illustrating, explaining and describing embodiments of the present invention. Further modifications and adaptations to these embodiments will be apparent to those skilled in the art and may be made without departing from the spirit of the invention or the scope of the following claims.

I claim:

1. A vehicle deceleration warning system comprising: a) a means for measuring the deceleration force of a vehicle; b) a microprocessor unit connected to the means for measuring the deceleration force; c) a license plate bracket comprising at least one light connected to the microprocessor unit; and d) at least one self-contained power source for supplying power to the means for measuring the deceleration force, the microprocessor unit, and the lights, wherein the means for measuring the deceleration force, the microprocessor unit, and the at least one self-contained power source are housed in the license plate bracket and wherein the at least one light illuminates when the means for measuring the deceleration force measures a deceleration force of the vehicle greater than a threshold force.

2. The system of claim 1, wherein the license plate bracket comprises a front housing adapted to be positioned distal the vehicle and a back housing adapted to be positioned proximal the vehicle.

3. The system of claim 2, wherein the front housing houses at least one of the means for measuring the deceleration force, the microprocessor unit, and the at least one self-contained power source.

4. The system of claim 2, wherein the back housing houses at least one of the means for measuring the deceleration force, the microprocessor unit, and the at least one self-contained power source.

5. The system of claim 2, wherein the license plate bracket is adapted to house a license plate between the front and back housing.

6. The system of claim 2, wherein the front and back housing are connected together.

7. The system of claim 6, wherein the front and back housing are melted together.

8. The system of claim 6, wherein the front and back housing are connected together via at least one of a snap-fit connection and at least one screw.

9. The system of claim 1, wherein the license plate bracket comprises plastic.

10. The system of claim 1, wherein the license plate bracket comprises metal.

11. The system of claim 1, wherein the license plate bracket is adapted to be positioned adjacent a license plate mounted on a vehicle.

12. The system of claim 1, wherein the at least one self-contained power source comprises a battery.

13. The system of claim 1, further comprising at least one solar panel.

14. The system of claim 1, further comprising a manual activation button to illuminate the at least one light.

15. The system of claim 1, wherein the microprocessor unit controls illumination of the at least one light.

16. The system of claim 1, wherein the at least one light is positioned on the front housing.

17. The system of claim 1, wherein the at least one light comprises a light emitting diode.

18. A method of warning drivers of a vehicle's rapid deceleration comprising installing the vehicle deceleration warning system of claim 1 on the vehicle.

19. A vehicle comprising the vehicle deceleration warning system of claim 1.

20. A vehicle deceleration warning system and housing comprising: a) a means for measuring the deceleration force of a vehicle; b) a microprocessor unit connected to the means for measuring the deceleration force; c) a plastic license plate bracket comprising a front housing adapted to be positioned distal the vehicle and a back housing adapted to be positioned proximal the vehicle, wherein the front housing comprises at least one light connected to the microprocessor unit and wherein the license plate bracket is adapted to house a license plate between the front and back housing; and d) at least one self-contained power source for supplying power to the means for measuring the deceleration force, the microprocessor unit, and the lights, wherein the means for measuring the deceleration force, the microprocessor unit, and the at least one self-contained power source are housed in the license plate bracket and wherein the at least one light illuminates when the means for measuring the deceleration force measures a deceleration force of the vehicle greater than a threshold force.

* * * * *